United States Patent [19]

Tokura et al.

[11] Patent Number: 4,853,734

[45] Date of Patent: Aug. 1, 1989

[54] DISPOSITION OF A FLEXIBLE PRINTED CIRCUIT BOARD IN A CAMERA

[75] Inventors: Go Tokura, Inagi; Masanori Ishikawa, Kawasaki; Akira Yamada, Yokohama, all of Japan

[73] Assignee: Canon Kabushiki Kaisha, Tokyo, Japan

[21] Appl. No.: 131,584

[22] Filed: Dec. 11, 1987

[30] Foreign Application Priority Data

Dec. 26, 1986 [JP] Japan .......................... 61-202979[[U]

[51] Int. Cl.[4] ................................................ G03B 7/00
[52] U.S. Cl. ..................................... 354/485; 354/288
[58] Field of Search ................................ 354/288, 485

[56] References Cited

U.S. PATENT DOCUMENTS

| | | | |
|---|---|---|---|
| 3,830,956 | 8/1974 | Wootton et al. | 174/68.5 |
| 3,846,805 | 11/1974 | Kiyohara et al. | 354/23 |
| 4,227,788 | 10/1980 | Shimizu et al. | 354/485 |
| 4,317,628 | 3/1982 | Shimizu | 354/288 |
| 4,359,277 | 11/1982 | Shimizu et al. | 354/219 |
| 4,652,939 | 3/1987 | Baumeister | 358/342 |
| 4,681,421 | 7/1987 | Yamada et al. | 354/485 |
| 4,711,548 | 12/1987 | Arakawa et al. | 354/485 |

FOREIGN PATENT DOCUMENTS

| | | |
|---|---|---|
| 1210671 | 2/1966 | Fed. Rep. of Germany . |
| 1993350 | 9/1968 | Fed. Rep. of Germany . |
| 51-29828 | 3/1976 | Japan . |
| 60-12101 | 4/1985 | Japan . |

OTHER PUBLICATIONS

Lyman, "Flexible Circuits Bend to Designers' Will," *Electronics*, Sep. 1977, pp. 97–105.

*Primary Examiner*—Donald A. Griffin
*Attorney, Agent, or Firm*—Fitzpatrick, Cella, Harper & Scinto

[57] ABSTRACT

A camera has a flexible printed circuit board provided with a storage device, such as an EEPROM, which is capable of electrically effecting the writing and erasing of information. The flexible printed circuit board is disposed along a front surface portion and along another surface portion of a camera body, and an information writing pad for the storage device is disposed in such a manner as to overlay a surface of a projecting portion which projects forward from a substantially flat portion of the camera body.

9 Claims, 1 Drawing Sheet

DISPOSITION OF A FLEXIBLE PRINTED CIRCUIT BOARD IN A CAMERA

BACKGROUND OF THE INVENTION

1. Field of the Invention

The present invention relates to a camera, and more particularly to a camera which has in its control unit a memory device, such as an EEPROM, which is capable of electrically effecting the writing and erasing of information.

2. Description of the Prior Art

Recently, cameras have been so designed that not only the operations of measuring the light and determining the exposure, but also the operations of range finding and focusing are effected automatically, and an electronic circuit is mounted in such a camera as a control unit for automatically effecting these operations.

In most cameras, this electronic circuit is mounted on a flexible printed circuit board, as has been proposed in West German Utility Model Publication No. 1,993,350 (issued on Sept. 5, 1968). Adjustment means, including a factory-adjusted variable resistor and a selector resistor, are provided in the electronic circuit. Hence, there are adjustments which must be made for each camera.

In conjunction with recent remarkable developments in the electronic circuit field, however, EEPROMs in which information can be electrically written, erased, or rewritten have become available on the market. By incorporating such an EEPROM in a camera, it has become possible to provide adjustment without involving a conventional complicated adjustment step. However, since the input of information to a writing pad portion in which information is to be stored is effected by contacts with input pins, the writing pad portion must have a solid, flat surface.

Therefore, it has been considered to cope with this requirement by disposing the writting pad portion on a hard substrate, or, for a flexible circuit board, by disposing on the rear side thereof a reinforcing substrate which has a backing or part having a flat surface, using conventionally known methods (Japanese Utility Model Publication No. 12101/1985, Japanese Utility Model Laid-Open No. 29828/1976, West German Patent No. 1,210,671, U.S. Pat. No. 4,317,628, and U.S. Pat. No. 4,681,421.

SUMMARY OF THE INVENTION

Accordingly, an object of the present invention is to provide a camera in which, in comparison with the aforementioned conventional methods, the formation of a solid, flat surface for the above-described writing pad portion is improved, to enable a reduction in costs and the efficient utilization of space, and an improvement in the operational efficiency of writing information.

To this end, according to the present invention, there is provided a camera having a camera body and a flexible printed circuit board having a storage device which is capable of electrically effecting the writing and erasing of information. The flexible printed circuit board is disposed along a front surface portion and another surface portion of a camera body, and an information writing pad for the storage device is disposed on the flexible printed circuit board in such a manner as to overlay a surface of a projecting portion of a spool chamber, a film cartridge chamber, or the like of the camera body which projects forward from a substantially flat portion of the camera body.

Other objects, features, and advantages of the present invention will become apparent from the following detailed description of the invention when read in conjunction with the accompanying drawings.

DESCRIPTION OF THE PREFERRED EMBODIMENT

Referring now to the accompanying drawings, an embodiment of the present invention will be described. It should be noted that although the camera of this embodiment shown in the appended drawings is a single-lens reflex camera, the camera of the present invention should not be restricted to the single-lens reflex camera.

Figure 1:
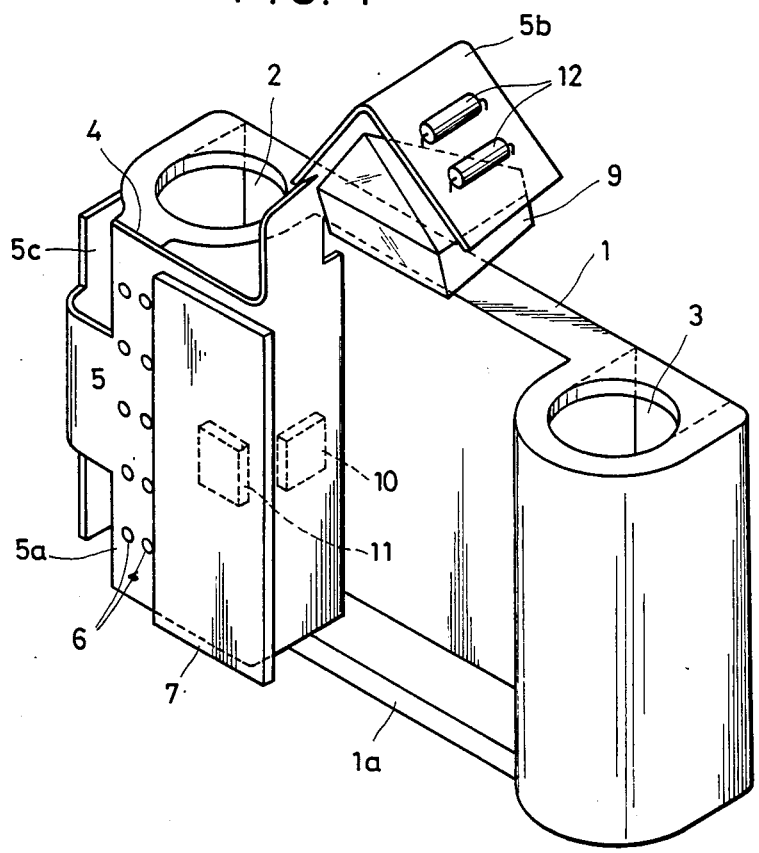
FIG. 1 is a perspective view illustrating a schematic structure of a main body portion of a camera in accordance with an embodiment of the present invention, with external parts of the camera removed.
Figure 2:
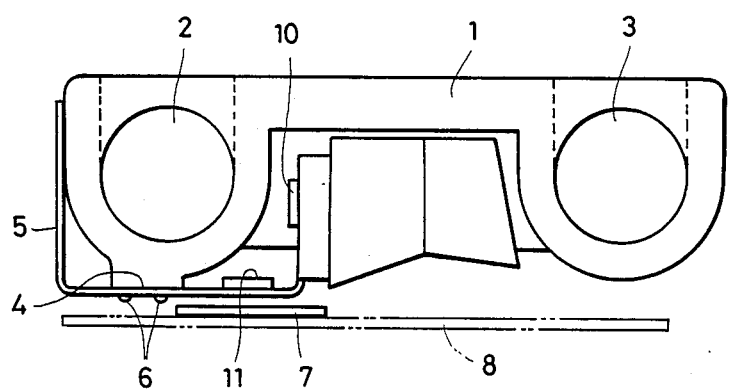
FIG. 2 is a top plan view of the camera of FIG. 1.

In FIGS. 1 and 2, film chambers, namely, a spool chamber 2 for accommodating a film takeup spool and a film cartridge chamber 3 for accommodating a film cartridge, are formed in a camera body 1. The spool chamber 2 and the film cartridge chamber 3 are substantially cylindrically shaped, and are arranged as projecting portions which project forward from a flat portion of the camera body. In this embodiment, a front surface of the spool chamber 2 has a flat surface portion 4 formed thereon which extends vertically. A flat surface portion 5a of a flexible printed circuit board 5 (hereafter referred to as the FPC board) abuts against the flat surface 4 in such a manner as to be in planar contact therewith. The front surface of the film cartridge chamber 3 may also have a flat surface portion for receiving the flexible printed circuit board 5 or another printed circuit board. Information writing pads 6 for a storage device are formed on the surface of the flat surface portion 5a which abuts against the flat surface 4. The FPC board 5 is bent at one end portion 5b thereof, as illustrated in the drawings, which is disposed along an upper surface of a penta prism 9. Circuit parts 12, including a resistor, a capacitor, etc., which constitute a circuit, are fixed to a surface of the FPC board which is parallel to an upper inclined surface of the penta prism 9. An IC chip 10 is fixed to a surface of the FPC board which is parallel to a side surface of a mirror box disposed between the spool chamber 2 and the film cartridge chamber 3. Furthermore, a storage device 11, such as an EEPROM, which is electrically connected to the information writing pads 6, is fixed to the rear surface of the portion of the FPC board which is parallel to the flat surface 4.

The other end portion 5c of the FPC board 5 is bent along a side surface of the camera body, and is fixed to a side surface of the spool chamber 2 by an appropriate fixing means.

A spacer/protection plate 7 is disposed in front of the flat surface portion 5a of the FPC board which is parallel to the flat surface 4, in such a manner as to avoid the area occupied by the information writing pads 6, and is supported by a lens board system (not shown), such as a mirror box. Accordingly, when external parts 8, such as a front cover, are installed on the front surface of the camera body 1, the information writing pads 6 are shielded from the outside by means of the external parts 8 in a manner such that a gap is formed between the external parts 8 and the information writing pads 6.

Therefore, even if something should hit the external parts 8, there is no risk of the information writing pads 6 becoming damaged. In addition, there is no danger of shortcircuiting, even if the external parts 8 are electrically conductive. Furthermore, if the external parts 8 are removed from the camera, the information writing pads 6 are exposed, so that the writing of information can be effected readily.

This positioning of the information writing pads 6 enables the adjustment and confirmation of written information, by simply removing the external parts 8, such as the front cover, without necessitating complicated disassembly during servicing (such as format revision or repair).

In addition, the external parts 8, particularly the front cover, are installed in the final stages of the assembly process. Accordingly, if the information writing pads 6 are positioned as described above, no jigs (apparatus) for setting the state necessary for writing information are required since assembly of the camera is practically finished (i.e., immediately before the front cover is installed) and since the information can be written in a state in which the camera itself has been operated. This means that information on the state of the camera can be written accurately, and the written information is not subjected to errors in subsequent processes.

As has been described above, since the camera of the present invention has a storage device, such as an EEPROM, in which stored information can be rewritten, and since information writing pads for the storage device are disposed on a front surface of a spool chamber or a front surface of a film cartridge chamber of a camera body, the writing of information in the storage device can be effected readily, and damage to the pads can be prevented. In addition, the camera in accordance with the present invention can be made to exhibit various functions by rewriting information in the storage device. In the camera of the present invention, since the information writing pads are disposed on a surface which is not normally used, such as the front surface of the spool chamber or the front surface of the film cartridge chamber, the ratio of utilization of space inside the camera is improved. This means that it becomes possible to mount a large number or other circuits on other portions of the FPC board. Moreover, since other parts, such as a hard substrate serving as a receiver for the information writing pads and a reinforcing member, are not required, it is possible to effect a reduction in cost.

What is claimed is:

1. A camera having a camera body, a flexible printed circuit board having a storage device which is capable of electrically effecting the writing and erasing of information, said flexible printed circuit board being disposed along a front surface portion and another surface portion of said camera body, and an information writing pad for said storage device, said information writing pad being disposed on said flexible printed circuit board in such a manner as to overlay a flat surface of the projecting portion of said camera body, wherein said surface of said projecting portion which underlies said information writing pad is formed so as to include a flat portion for receiving said information writing pad.

2. A camera according to claim 1, wherein said projecting portion is formed on a spool of said camera, wherein said information writing pad is disposed in such a manner as to correspond to the position of the projecting front surface of said spool chamber, and wherein said projecting front surface of said spool chamber is formed so as to include a flat portion for receiving said information writing pad.

3. A camera according to claim 1, wherein said projecting portion is formed on a film cartridge chamber of said camera, wherein said information writing pad is disposed in such a manner as to correspond to the position of the projecting front surface of said film cartridge chamber, and wherein said projecting front surface of said film cartridge chamber is formed so as to include a flat portion for receiving said information writing pad.

4. A camera according to claim 1, wherein separate flexible printed circuit boards are disposed on said front surface portion and an upper surface portion of said camera body.

5. A camera body according to claim 1, wherein a detachable cover is disposed over a front side of said information writing pad.

6. A camera according to claim 1, wherein said storage device comprises an EEPROM.

7. In a single-lens reflex camera having a body and a cover, a flexible printed circuit board having a storage device which is capable of electrically effecting writing and erasing of information, said flexible printed circuit board being disposed along a front surface portion of said camera and along a penta prism portion on an upper surface of said camera body, and an information writing pad for said storage device, said information writing pad being disposed on said flexible printed circuit board in such a manner as to overlay a front surface of a film chamber of said camera body, whereby said information writing pad can be epxosed by opening said cover, wherein said front surface portion of said camera body is flat and wherein said information writing pad is disposed on said flexible circuit board where said flexible circuit board is disposed on said front surface portion of said camera body.

8. A camera according to claim 7, wherein said storage device comprises an EEPROM.

9. A camera having a camera body, a flexible printed circuit board having a storage device which is capable of electrically effecting the writing and erasing of information, said flexible printed circuit board being disposed along a front surface portion and another surface portion of said camera body, and an information writing pad for said storage device, said information writing pad being disposed on said flexible printed circuit board and underlying a cover portion of the camera body.

* * * * *

UNITED STATES PATENT AND TRADEMARK OFFICE
CERTIFICATE OF CORRECTION

PATENT NO. : 4,853,734

DATED : August 1, 1989

INVENTOR(S) : Go Tokura, et al.

It is certified that error appears in the above-identified patent and that said Letters Patent is hereby corrected as shown below:

COLUMN 1:

Line 39, "writting" should read --writing--.

Line 47, "Pat. No. 4,681,421." should read --Pat. No. 4,681,421).--

COLUMN 4:

Line 8, "spool" should read --spool chamber--.

Line 43, "epxosed" should read --exposed--.

Signed and Sealed this

Twelfth Day of June, 1990

Attest:

HARRY F. MANBECK, JR.

*Attesting Officer*  *Commissioner of Patents and Trademarks*